United States Patent
Lardner et al.

(10) Patent No.: US 11,122,736 B2
(45) Date of Patent: Sep. 21, 2021

(54) HARVESTER ROLLER CONFIGURATION

(71) Applicant: Deere & Company, Moline, IL (US)

(72) Inventors: Ethan D. Lardner, Moline, IL (US); Bryan R. Yanke, Eldridge, IA (US); Mark Schuler, Geneseo, IL (US)

(73) Assignee: DEERE & COMPANY, Moline, IL (US)

( * ) Notice: Subject to any disclaimer, the term of this patent is extended or adjusted under 35 U.S.C. 154(b) by 270 days.

(21) Appl. No.: 16/381,477

(22) Filed: Apr. 11, 2019

(65) Prior Publication Data
US 2020/0323131 A1    Oct. 15, 2020

(51) Int. Cl.
| | | |
|---|---|---|
| A01D 34/43 | (2006.01) | |
| A01D 34/62 | (2006.01) | |
| A01D 41/12 | (2006.01) | |
| F16C 13/00 | (2006.01) | |
| A01D 41/02 | (2006.01) | |

(52) U.S. Cl.
CPC .............. *A01D 34/43* (2013.01); *A01D 34/62* (2013.01); *A01D 41/12* (2013.01); *A01D 41/02* (2013.01); *F16C 13/00* (2013.01)

(58) Field of Classification Search
CPC ........ A01D 34/43; A01D 34/62; A01D 41/12; A01D 61/002; A01D 61/02; A01D 41/14; A01D 41/1235; A01D 41/06; A01D 57/02; A01D 57/025; F16C 13/00; F16C 2310/00
See application file for complete search history.

(56) References Cited

U.S. PATENT DOCUMENTS

| | | | | | |
|---|---|---|---|---|---|
| 2,534,818 | A | * | 12/1950 | Holroyd ................. | D06F 83/00 442/137 |
| 3,646,652 | A | * | 3/1972 | Heiligenthal .......... | B41N 7/005 492/53 |
| 3,673,025 | A | | 6/1972 | Fukuyama et al. | |
| 3,847,260 | A | * | 11/1974 | Fowler ................... | B65G 39/04 193/37 |
| 4,035,534 | A | * | 7/1977 | Nyberg .................. | B29C 61/08 428/34.9 |
| 4,038,809 | A | * | 8/1977 | Arnould ................. | A01D 57/20 56/124 |
| 4,098,061 | A | * | 7/1978 | Spiker .................... | A01D 41/14 56/124 |
| 5,044,482 | A | * | 9/1991 | Kramer ................... | F16F 3/093 193/37 |

(Continued)

FOREIGN PATENT DOCUMENTS

JP        07156312 A  *  6/1995  ............ B31F 1/2845

*Primary Examiner* — Arpad Fabian-Kovacs
(74) *Attorney, Agent, or Firm* — Michael Best & Friedrich LLP

(57) ABSTRACT

A roller is connected to a harvesting platform for movement with a combine over a ground surface in a direction of travel. The roller includes a first portion defining a first diameter and including a first material, and a second portion defining a second diameter and including a second material. The second diameter is greater than the first diameter. The second portion substantially surrounds the first portion, the second material has different material properties than the first material. The roller extends in the direction of travel and rotates about a second axis which extends generally parallel to the direction of travel.

20 Claims, 17 Drawing Sheets

(56) References Cited

U.S. PATENT DOCUMENTS

| | | | | |
|---|---|---|---|---|
| 5,091,027 | A * | 2/1992 | Watanabe | B29C 63/18 |
| | | | | 156/172 |
| 5,324,248 | A * | 6/1994 | Quigley | B29D 99/0032 |
| | | | | 29/895.21 |
| 5,749,289 | A * | 5/1998 | Anderson | A01F 15/07 |
| | | | | 100/88 |
| 6,059,095 | A * | 5/2000 | Tsuji | B65G 39/02 |
| | | | | 193/35 F |
| 6,280,371 | B1 * | 8/2001 | Krippelz | B23P 15/00 |
| | | | | 29/895.213 |
| 6,375,602 | B1 * | 4/2002 | Jones | D21G 1/024 |
| | | | | 492/50 |
| 6,409,645 | B1 * | 6/2002 | Paasonen | D21F 3/08 |
| | | | | 101/375 |
| 6,811,524 | B2 | 11/2004 | Zimmermann | |
| 2005/0153821 | A1 * | 7/2005 | Grinberg | F16C 13/00 |
| | | | | 492/44 |
| 2006/0172072 | A1 * | 8/2006 | Paasonen | B05D 7/58 |
| | | | | 427/372.2 |
| 2009/0272620 | A1 * | 11/2009 | Dallum | B65G 39/02 |
| | | | | 193/37 |
| 2014/0100097 | A1 * | 4/2014 | Takano | C08G 18/0823 |
| | | | | 492/56 |
| 2014/0274236 | A1 * | 9/2014 | Priepke | B65G 65/42 |
| | | | | 460/114 |
| 2019/0000015 | A1 * | 1/2019 | Lauwers | A01D 41/14 |
| 2019/0124831 | A1 * | 5/2019 | DeChristopher | A01D 34/30 |

* cited by examiner

HARVESTER ROLLER CONFIGURATION

BACKGROUND

The present disclosure relates to harvesters and idler rollers for harvesters.

SUMMARY

In some embodiments, the disclosure provides a harvester including a combine having a prime mover operable to move the combine over a ground surface in a direction of travel, and a harvesting platform connected to the combine for movement with the combine over the ground surface. The harvesting platform includes a drive roller rotating about a first axis, and an idler roller rotating about a second axis. The idler roller includes a first portion and a second portion. The first portion of the idler roller has a first diameter and includes a first material, the second portion of the idler roller defines a second diameter and includes a second material. The second diameter is greater than the first diameter, and the second portion substantially surrounds the first portion. The second material has different material properties than the first material. A conveyor is connected to the drive roller and to the idler roller, such that the conveyor moves in response to rotation of the drive roller.

In some embodiments, the disclosure provides a harvesting platform connected to a combine for movement with the combine over a ground surface in a direction of travel. The harvesting platform includes a cutter bar that cuts grain being harvested, a reel that presses the grain against the cutter bar to thereby cut the grain, a drive roller that rotates about a first axis. The drive roller includes a first portion and a second portion. The first portion of the drive roller defines a first diameter and includes a first material; the second portion of the drive roller defines a second diameter and includes a second material. The second diameter is greater than the first diameter, the second portion substantially surrounds the first portion, and the second material has different material properties than the first material. An idler roller rotates about a second axis. A conveyor is connected to the drive roller and to the idler roller. The conveyor moves in response to rotation of the drive roller, to thereby move harvested grain toward the combine.

In some embodiments the disclosure provides a harvesting platform connected to a combine for movement with the combine over a ground surface in a direction of travel. The harvesting platform includes a cutter bar that cuts grain being harvested, a reel that presses the grain against the cutter bar to thereby cut the grain, a drive roller rotating about a first axis, and an idler roller rotating about a second axis. The drive roller includes a first portion and a second portion. The first portion of the drive roller defines a first diameter and includes a first material; the second portion of the drive roller defines a second diameter and includes a second material. The second diameter is greater than the first diameter, the second portion substantially surrounds the first portion, and the second material has different material properties than the first material. The idler roller includes a first portion and a second portion. The first portion of the idler roller has a first diameter and includes a first material, the second portion of the idler roller defines a second diameter and includes a second material. The second diameter is greater than the first diameter, and the second portion substantially surrounds the first portion. The second material has different material properties than the first material. A conveyor is connected to the drive roller and to the idler roller, such that the conveyor moves in response to rotation of the drive roller.

Other aspects of the disclosure will become apparent by consideration of the detailed description and accompanying drawings.

DETAILED DESCRIPTION

Before any embodiments of the disclosure are explained in detail, it is to be understood that the disclosure is not limited in its application to the details of construction and the arrangement of components set forth in the following description or illustrated in the following drawings. The disclosure is capable of other embodiments and of being practiced or of being carried out in various ways.

Figure 1:
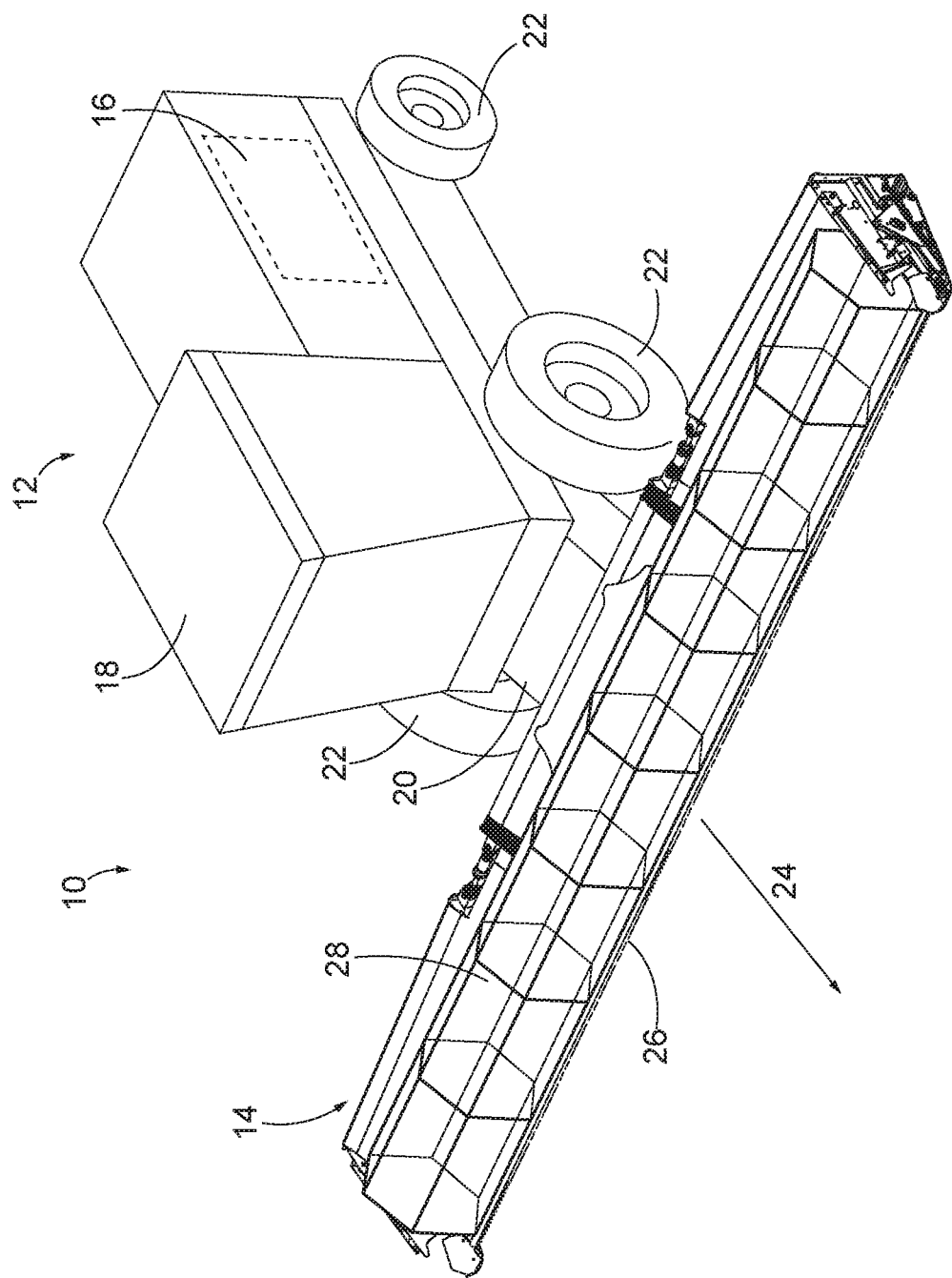
FIG. 1 is a perspective view of a harvester.

FIG. 1 illustrates a harvester 10 according to some embodiments. The illustrated harvester 10 includes a combine 12 and a harvesting platform 14. The combine 12 includes a prime mover 16, a cab 18, a feeder house 20, and a plurality of ground-engaging devices 22. The prime mover 16 is configured to move the combine 12 in a direction of travel 24 via the ground-engaging devices 22. The illustrated ground-engaging devices 22 are wheels, but tracks or other suitable ground-engaging devices can be utilized.

The harvesting platform 14 includes a cutter bar 26 that is configured to cut grain being harvested, and a reel 28 that configured to press the grain against the cutter bar to thereby cut the grain.

Figure 2:
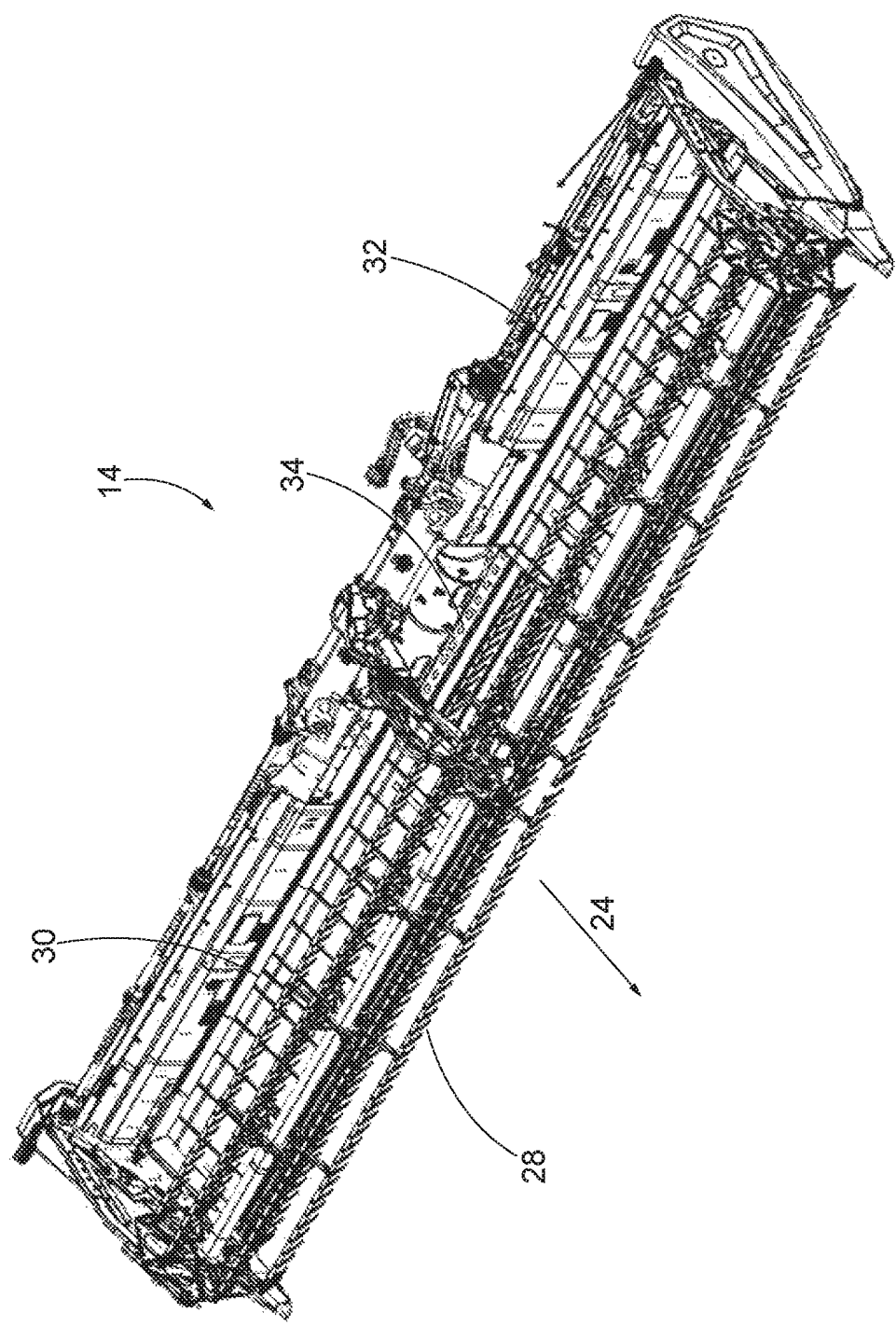
FIG. 2 is a perspective view of a harvesting platform.

FIG. 2 shows the harvesting platform 14 in greater detail. The harvesting platform 14 includes a first conveyor assembly 30, a second conveyor assembly 32, and a third conveyor assembly 34. The first conveyor assembly 30 is configured to move harvested grain generally perpendicular to the direction of travel 24 toward the third conveyor assembly 34. The second conveyor assembly 32 is configured to move harvested grain generally perpendicular to the direction of travel 24 toward the third conveyor assembly 34. The third conveyor assembly 34 is configured to move harvested grain opposite of the direction of travel 24 and into the feeder house 20 (see FIG. 1).

Figure 3:
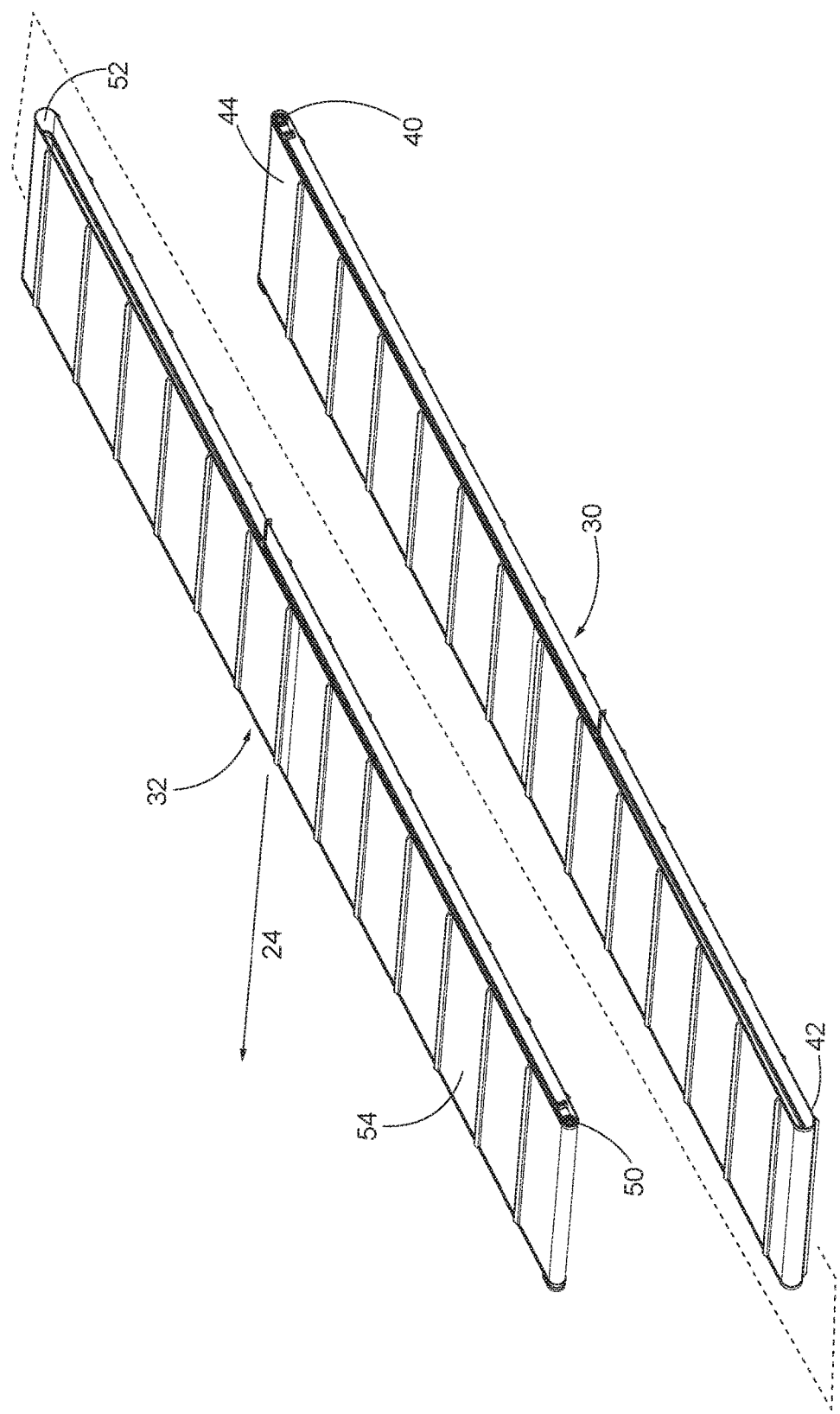
FIG. 3 is a perspective view of two conveyor belts of the harvesting platform.

FIG. 3 illustrates the first conveyor assembly 30 and the second conveyor assembly 32 in greater detail. FIG. 3 shows the first conveyor assembly 30 below the second conveyor assembly 32 for clarity. However, the first conveyor assembly 30 and the second conveyor assembly 32 extend along a common plane. In some embodiments, the second conveyor assembly 32 is substantially a mirror-image of the first conveyor assembly 30.

The first conveyor assembly 30 includes a first drive roller 40, a first idler roller 42, and a first draper belt 44. The first drive roller 40 extends in the direction of travel 24 and is configured to rotate about a first drive axis via the prime mover 16 or a separate power source. The first idler roller 42 extends in the direction of travel 24 and is configured to rotate about a first idler axis. The first draper belt 44 extends around the first drive roller 40 and the first idler roller 42. The first draper belt 44 engages the first drive roller 40 to move around the first drive roller 40 and thereby rotate the first idler roller 42 in response to rotation of the first drive roller 40. In some embodiments, the positions of the first drive roller 40 and the first idler roller 42 are exchanged without changing the functioning of the first draper belt 44.

The second conveyor assembly 32 includes a second drive roller 50, a second idler roller 52, and a second draper belt 54. The second drive roller 50 extends in the direction of travel 24 and is configured to rotate about a second drive axis via the prime mover or a separate power source. The second idler roller 52 extends in the direction of travel 24 and is configured to rotate about a second idler axis. The second draper belt 54 extends around the second drive roller 50 and the second idler roller 52. The second draper belt 54 engages the second drive roller 50 to move around the second drive roller 50 and thereby rotate the second idler roller 52 in response to rotation of the second drive roller 50. In some embodiments, the positions of the second drive roller 50 and the second idler roller 52 are exchanged without changing the functioning of the second draper belt 54.

Figure 4:
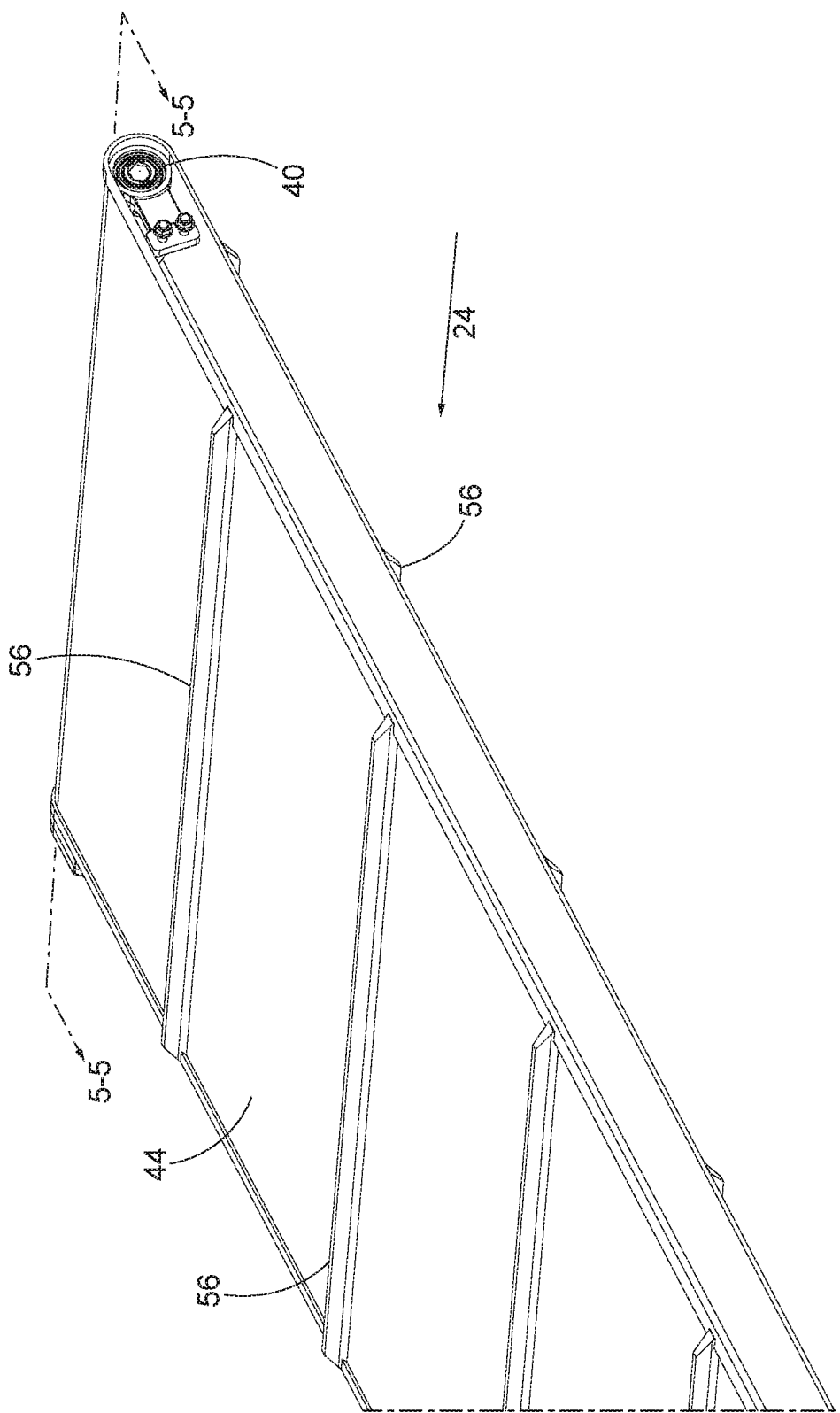
FIG. 4 is a close up view of a first end of a conveyor belt.

FIG. 4 is a close up view of the first drive roller 40 and the first draper belt 44. The first draper belt 44 includes a plurality of ribs 56 extending outward from the first draper belt 44. The ribs 56 are configured to move harvested grain toward the combine in response to movement of the first draper belt 44 around the first drive roller 40 and the first idler roller 42. Other quantities and configurations of ribs 56 can be utilized in other embodiments.

Figure 5:
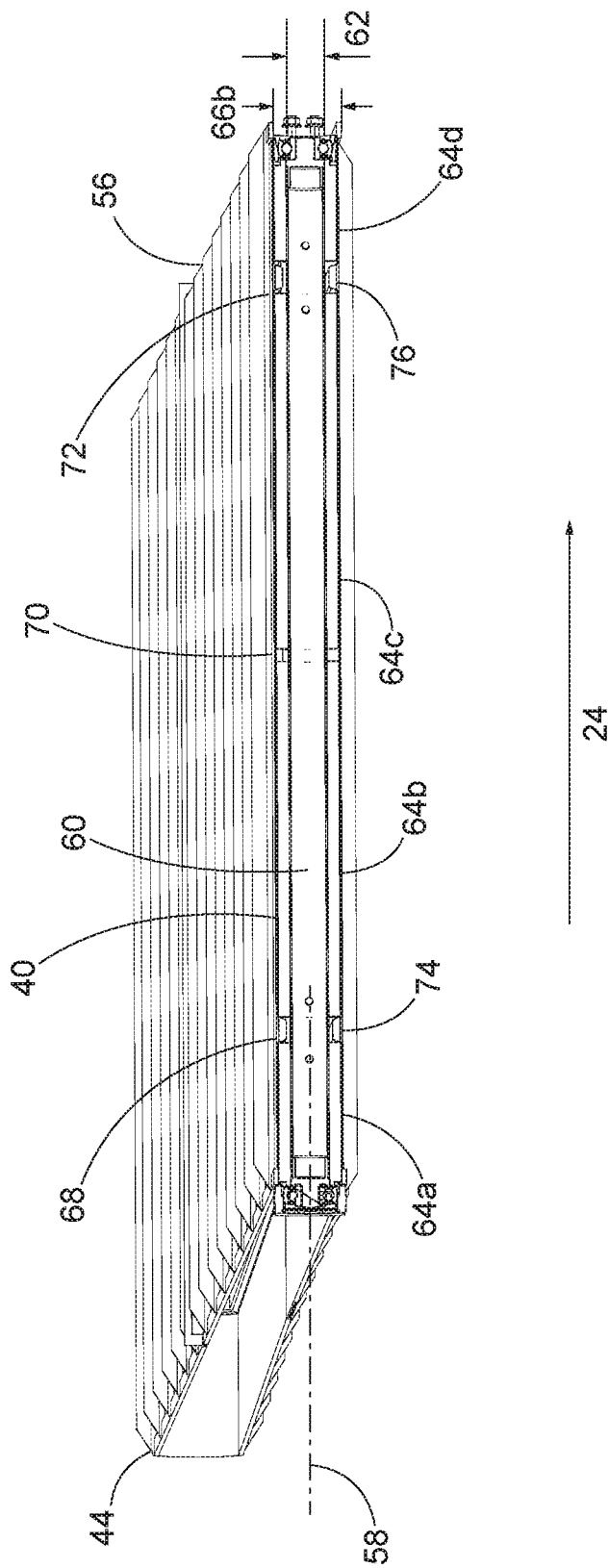
FIG. 5 is a cross-sectional view taken along like 5-5 of FIG. 4.

FIG. 5 is a cross-sectional view of the first drive roller 40 and the first draper belt 44. The first drive roller 40 extends in the direction of travel 24 and is rotatable about a first axis 58 to thereby move the first draper belt 44 around the first drive roller 40 and the first idler roller 42. The first drive roller 40 includes an inner elongate substantially cylindrical portion 60 that extends along a first length and defines a first diameter 62 that is substantially constant along the first length.

Figure 6:
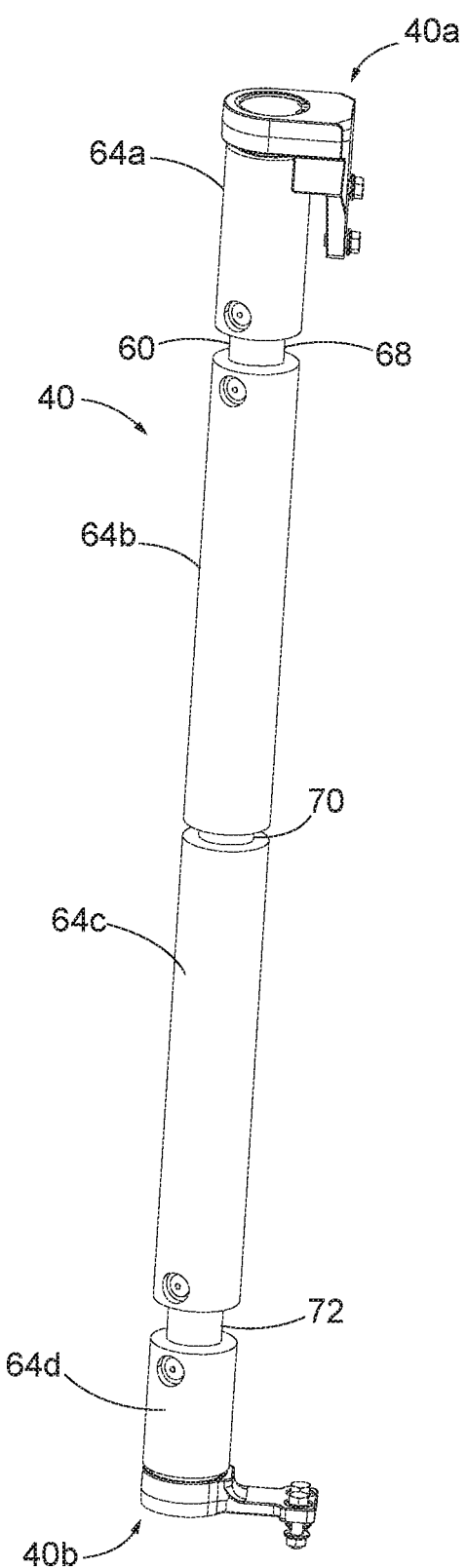
FIG. 6 is a perspective view of a roller for use with the conveyor belts.
Figure 7:
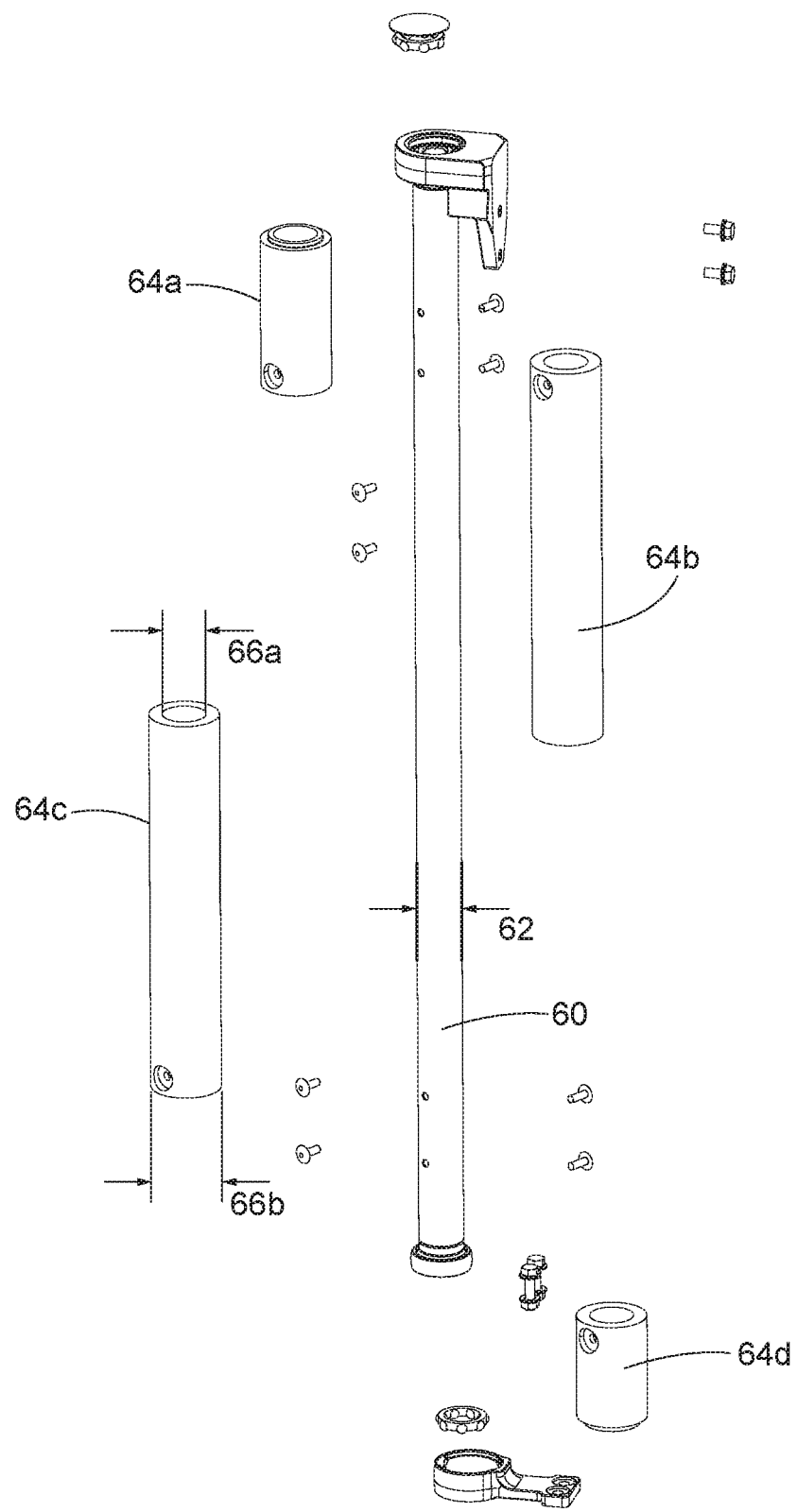
FIG. 7 is an exploded view of the roller of FIG. 6.

With reference to FIGS. 6 and 7, the first drive roller 40 also includes a first sleeve 64a, a second sleeve 64b, a third sleeve 64c and a fourth sleeve 64d. The sleeves 64a, 64b, 64c and 64d have an inner diameter 66a that substantially corresponds to the first diameter 62 and an outer diameter 66b that is greater than the inner diameter. The sleeves 64a, 64b, 64c and 64d substantially surround the inner elongate cylindrical portion 60. The first sleeve 64a is positioned adjacent a first end 40a of the first drive roller 40 and the second sleeve 64b is positioned near the first sleeve 64a, but is spaced apart from the first sleeve 64a to form a first gap 68 between the first sleeve 64a and the second sleeve 64b. The third sleeve 64c is positioned near the second sleeve 64b, but is spaced apart from the second sleeve 64b to form a second gap 70 between the second sleeve 64b and the third sleeve 64c. The fourth sleeve 64d is positioned near the third sleeve 64c, but is spaced apart from the third sleeve 64c to form a third gap 72 between the third sleeve 64c and the fourth sleeve 64d. The fourth sleeve 64d is also positioned adjacent a second end 40b of the first drive roller 40. The inner elongate cylindrical portion 60 extends along substantially the entire distance between the first end 40a and the second end 40b. The first length of the first portion is greater than a sum of a length of the first, second, third and fourth sleeves 64a, 64b, 64c and 64d.

As shown in FIG. 5, the first draper belt 44 includes an outer surface and an inner surface. The outer surface includes the ribs 56 and the inner surface includes a first protrusion 74 and a second protrusion 76. The first protrusion 74 extends substantially perpendicular to the ribs 56 and extends into the first gap 68 formed between the first sleeve 64a and the second sleeve 64b. The second protrusion 76 extends substantially perpendicular to the ribs 56 and extends into the third gap 72 formed between the third sleeve 64c and the fourth sleeve 64d.

The first and third gaps 68 and 72 engage the respective protrusions 74 and 76 to retain the first draper belt 44 in the correct position on the first drive roller 40. The outer diameter of the first drive roller 40 must be large enough to increase durability of the first draper belt 44 during use. Previously, the gaps were formed by machining grooves into an outer surface of the roller. This added manufacturing time and cost as well as creating stress risers under a tension load. In order to combat the stress risers, extra material was added to an outer surface of the first drive roller 40, which further added manufacturing time and cost. In the illustrated embodiment, the second gap 70 is provided to permit adjustment of the width of the first and third gaps 68 and 72. In some embodiments, an additional protrusion extends into the second gap 70. Additional configurations of gaps and protrusions are possible and can be utilized in other embodiments.

The inner elongate cylindrical portion 60 of the drive roller 40 includes a first material and the sleeves 64a, 64b, 64c and 64d of the drive roller 40 include a second material that has different material properties than the first material. The sleeves 64a, 64b, 64c, 64d can be pressed, molded around or otherwise secured to the inner elongate substantially cylindrical portion 60. The sleeves 64a, 64b, 64c, 64d are secured to the inner elongate substantially cylindrical portion 60 by bolts, rivets, epoxy or other suitable mechanical fastener, or by a press fit relationship. Little if any stress risers exist on the inner elongate cylindrical portion 60 of the drive roller 40 or any of the sleeves 64a, 64b, 64c, 64d.

The inner elongate cylindrical portion 60 bears essentially the entire load of the first draper belt 44 while the sleeves 64a, 64b, 64c, 64d increase the diameter of the drive roller 40 to the acceptable minimum diameter to increase durability of the first draper belt 44. The sleeves 64a, 64b, 64c, 64d are designed in a variety of configurations to create an outer profile that corresponds to the inner surface of the first draper belt 44.

In some embodiments, the first material is metallic and the second material is a composite. Possible composites include polyethylene, ultra-high-molecular-weight polyethylene and other polymers and polymer composites. In other embodiments, the first material is a relatively heavy metal and the second material is a relative light metal. The second material is lighter in weight than the first material, thus reducing the overall weight of the first drive roller 40. The second material can be selected to reduce friction between the first draper belt 44 and the first drive roller 40 to thereby increase a lifespan of the first drive roller 40, the first draper belt 44 or both.

Table 1 below includes a few possible options of drive roller 40 materials according to some embodiments and are given by way of example only.

TABLE 1

| Material | Steel | Aluminum | Ultra High Molecular Weight Polyethylene |
|---|---|---|---|
| Density (g/cm³) | 7.85 | 2.70 | 0.95 |
| Modulus of Elasticity (GPa) | 180-200 | 70-80 | 0.1-1.3 |

In Example 1, the inner elongate cylindrical portion 60 is made of steel and the sleeves 64a, 64b, 64c and 64d are made of Ultra High Molecular Weight Polyethylene (UHMW-PE). Steel has a density that is greater than the density of UHMW-PE. Therefore, the inner elongate cylindrical portion 60 has a greater density than the sleeves 64a, 64b, 64c, 64d. Steel also has a greater modulus of elasticity than UHMW-PE. In some embodiments, the inner elongate cylindrical portion 60 has a modulus of elasticity that is at least 30 percent greater than the modulus of elasticity of the sleeves 64a, 64b, 64c, 64d. While UHMW-PE is included in Example 1, other polymers or polymer composites can be utilized.

In Example 2, the inner elongate cylindrical portion 60 is made of aluminum and the sleeves 64a, 64b, 64c and 64d are made of Ultra High Molecular Weight Polyethylene (UHMW-PE). Aluminum has a greater density than UHMW-PE. Therefore, the inner elongate cylindrical portion 60 has a greater density than the sleeves 64a, 64b, 64c, 64d. Aluminum also has a greater modulus of elasticity than UHMW-PE. In some embodiments, the inner elongate cylindrical portion 60 has a modulus of elasticity that is at least 30 percent greater than the modulus of elasticity of the sleeves 64a, 64b, 64c 64d. While UHMW-PE is included in Example 2, other polymers or polymer composites can be utilized.

In Example 3, the inner elongate cylindrical portion 60 is made of steel and the sleeves 64a, 64b, 64c and 64d are made of aluminum. Steel has a greater density than aluminum. Therefore, the inner elongate cylindrical portion 60 has a greater density than the sleeves 64a, 64b, 64c, 64d. Steel also has a greater modulus of elasticity than aluminum. In some embodiments, the inner elongate cylindrical portion 60 has a modulus of elasticity that is at least 30 percent greater than the sleeves 64a, 64b, 64c 64d.

Figure 8:
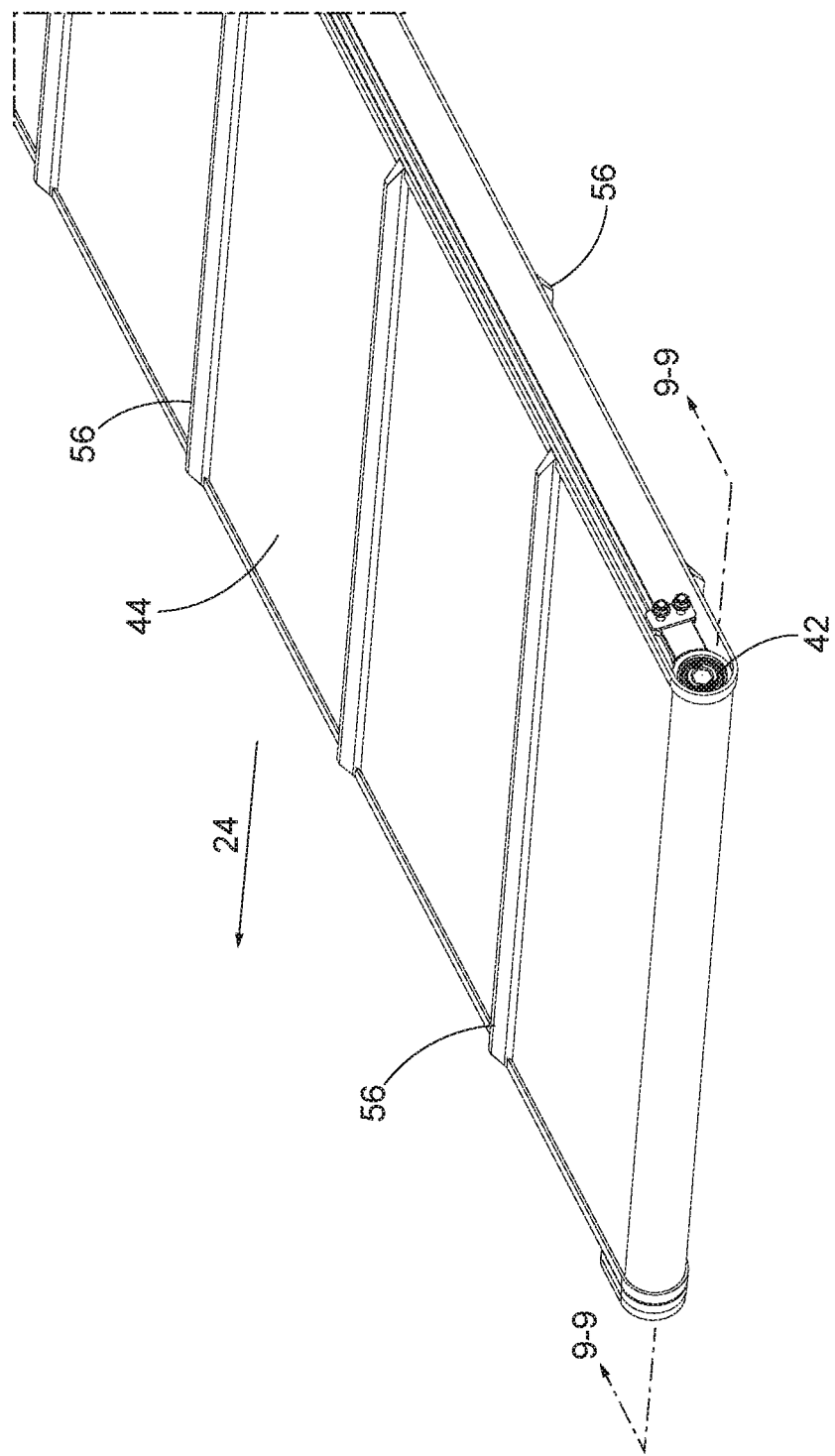
FIG. 8 is a close up view of a second end of the conveyor belt.

FIG. 8 is a close up view of the first idler roller 42 and the first draper belt 44. In some embodiments, the first idler roller 42 is substantially identical to the first drive roller 40. The main difference is that the first drive roller 40 is connected to a power source to rotate the first drive roller 40, whereas the first idler roller 42 is rotated in response to rotation of the first draper belt 44 in response to rotation of the first drive roller 40.

Figure 9:
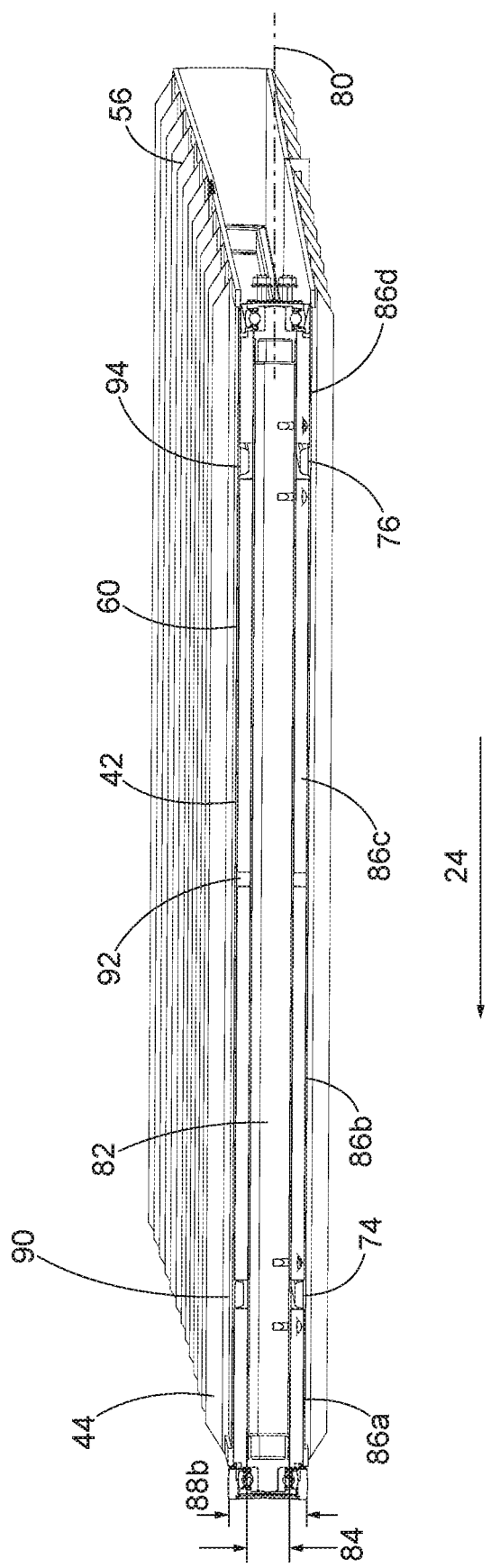
FIG. 9 is a cross-sectional view taken along like 9-9 of FIG. 8.

FIG. 9 is a cross-sectional view of the first idler roller 42. The first idler roller 42 extends in the direction of travel 24 and is rotatable about a second axis 80 in response to movement of the first draper belt 44 around the first drive roller 40 and the first idler roller 42 caused by rotation of the first drive roller 40. The first idler roller 42 includes an inner elongate substantially cylindrical portion 82 that extends along a second length and defines a first diameter 84 that is substantially constant along the second length.

Figure 10:
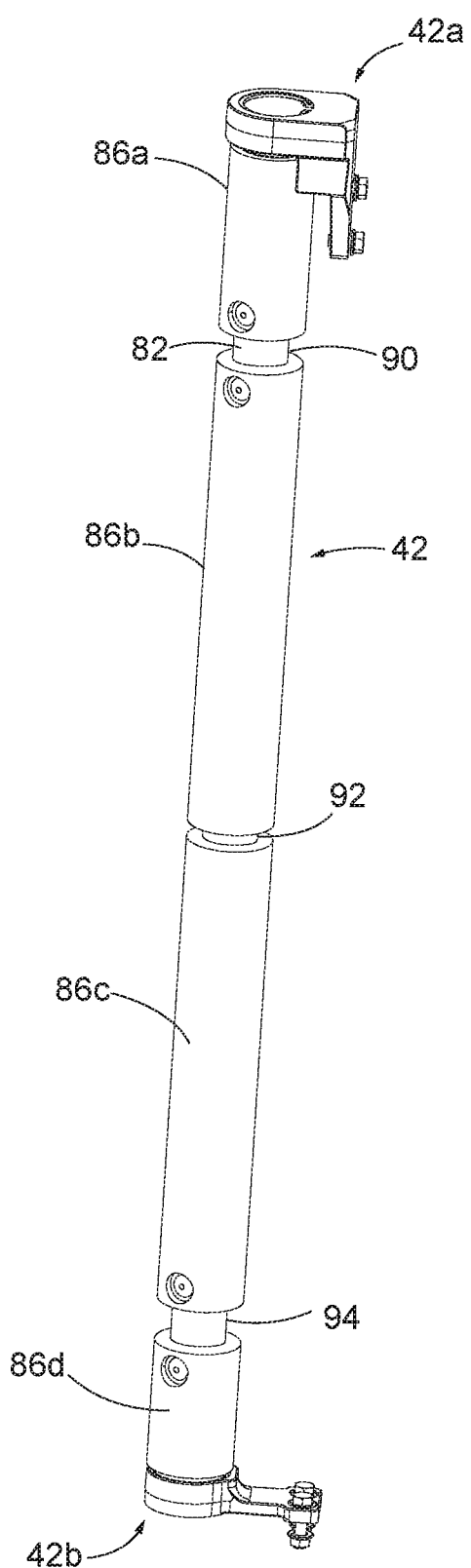
FIG. 10 is a perspective view of a roller for use with the conveyor belts.
Figure 11:
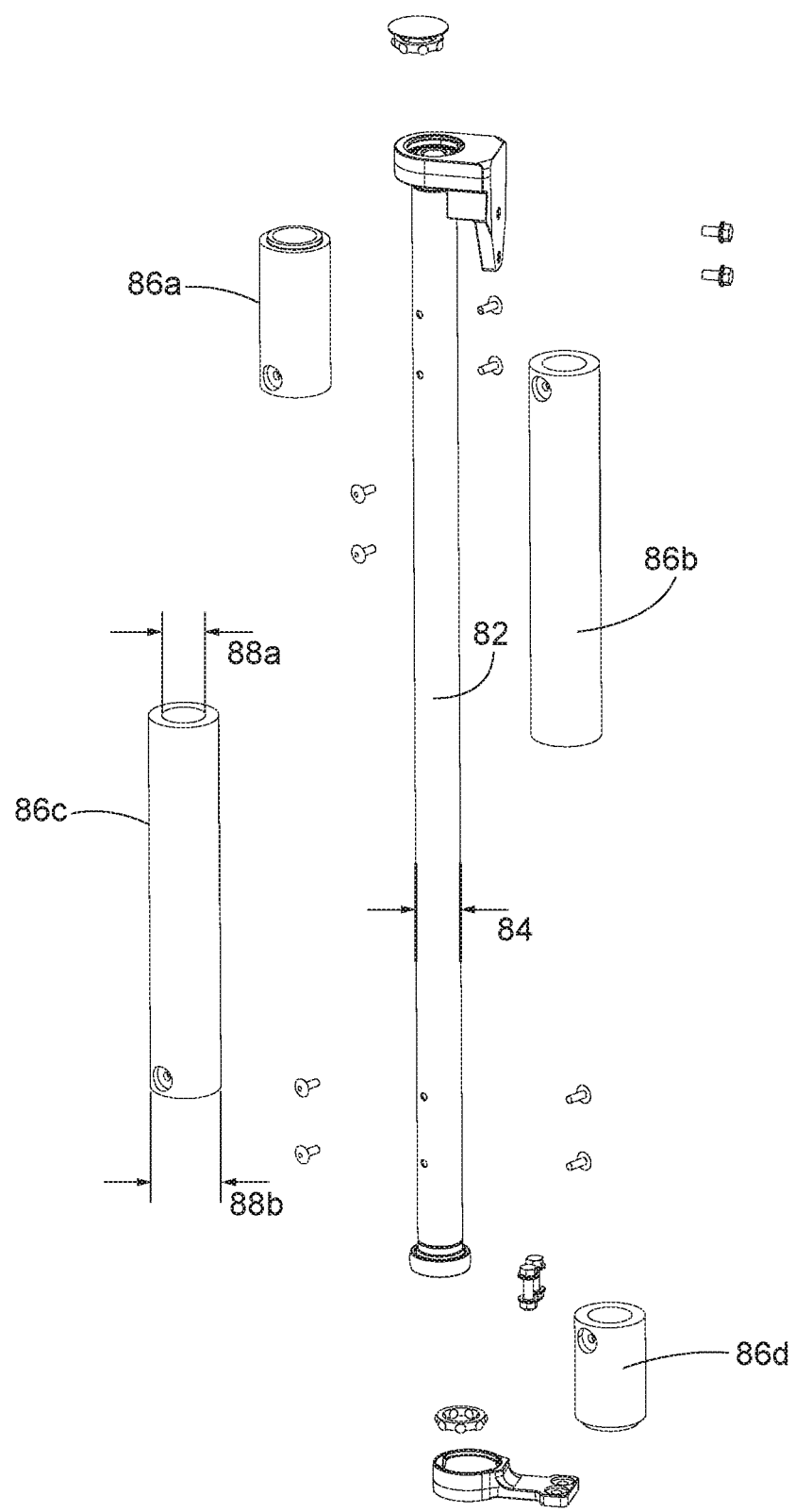
FIG. 11 is an exploded view of the roller of FIG. 10.

With reference to FIGS. 10 and 11, the first idler roller 42 also includes a first sleeve 86a, a second sleeve 86b, a third sleeve 86c and a fourth sleeve 86d. The sleeves 86a, 86b, 86c and 86d have an inner diameter 88a that substantially corresponds to the first diameter 84 and an outer diameter 88b that is greater than the inner diameter. The sleeves 86a, 86b, 86c and 86d substantially surround the inner elongate cylindrical portion 82. The first sleeve 86a is positioned adjacent a first end 42a of the first idler roller 42 and the second sleeve 86b is positioned near the first sleeve 86a, but is spaced apart from the first sleeve 86a to form a fourth gap 90 between the first sleeve 86a and the second sleeve 86b. The third sleeve 86c is positioned near the second sleeve 86b, but is spaced apart from the second sleeve 86b to form a fifth gap 92 between the second sleeve 86b and the third sleeve 86c. The fourth sleeve 86d is positioned near the third sleeve 86c, but is spaced apart from the third sleeve 86c to form a sixth gap 94 between the third sleeve 86c and the fourth sleeve 86d. The fourth sleeve 86d is also positioned adjacent a second end 42b of the first idler roller 42. The inner elongate cylindrical portion 82 extends along substantially the entire distance between the first end 42a and the second end 42b. The second length of the inner elongate cylindrical portion 82 is greater than a sum of a length of the first, second, third and fourth sleeves 86a, 86b, 86c and 86d.

As shown in FIG. 9, the first protrusion 74 of the first draper belt 44 extends into the fourth gap 90 formed between the first sleeve 86a and the second sleeve 86b. The second protrusion 76 extends into the sixth gap 94 formed between the third sleeve 86c and the fourth sleeve 86d. In the illustrated embodiment, the fifth gap 92 is provided to permit adjustment of the width of the fourth and sixth gaps 90 and 94. In some embodiments, an additional protrusion extends into the fifth gap 92.

The second drive roller 50 can be identical to the first drive roller 40, the second idler roller 52 can be identical to the first idler roller 42, and the second draper belt 54 can be identical to the first draper belt 44.

The fourth and sixth gaps 90 and 94 engage the respective protrusions 74 and 76 to retain the first draper belt 44 in the correct position on the first idler roller 42. The outer diameter of the first idler roller 42 must be large enough to increase durability of the first draper belt 44 during use. Previously, the gaps were formed by machining grooves into an outer surface of the roller. This added manufacturing time and cost as well as creating stress risers under a tension load. In order to combat the stress risers, extra material was added to an outer surface of the first idler roller 42, which further added manufacturing time and cost. In the illustrated embodiment, the second gap 70 is provided to permit adjustment of the width of the first and third gaps 68 and 72. In some embodiments, an additional protrusion extends into the second gap 70. Additional configurations of gaps and protrusions are possible and can be utilized in other embodiments.

The inner elongate cylindrical portion 82 of the idler roller 42 includes a first material and the sleeves 86a, 86b, 86c and 86d of the idler roller 42 include a second material that has different material properties than the first material. The inner elongate cylindrical portion 82 bears essentially the entire load of the first draper belt 44 while the sleeves 86a, 86b, 86c and 86d increase the diameter of the idler roller 42 to the acceptable minimum diameter to increase durability of the first draper belt 44. The sleeves 86a, 86b, 86c and 86d are designed in a variety of configurations to create an outer profile that corresponds to the inner surface of the first draper belt 44.

In some embodiments, the first material is metallic and the second material is a composite. Possible composites include polyethylene, ultra-high-molecular-weight polyethylene and other polymers and polymer composites. In other embodiments, the first material is a relatively heavy metal and the second material is a relative light metal. The second material is lighter in weight than the first material, thus reducing the overall weight of the first idler roller 42. The second material can be selected to reduce friction between the first draper belt 44 and the first idler roller 42 to thereby increase a lifespan of the first idler roller 42, the first draper belt 44 or both.

The sleeves 86a, 86b, 86c and 86d can be pressed, molded around or otherwise secured to the inner elongate substantially cylindrical portion 82. The sleeves 86a, 86b, 86c and 86d are secured to the inner elongate substantially cylindrical portion 82 by bolts, rivets, epoxy or other suitable mechanical fastener, or by a press fit relationship. Little if any stress risers exist on the inner elongate cylindrical portion 82 of the idler roller 42 or any of the sleeves 86a, 86b, 86c and 86d.

Table 2 below includes a few possible options of idler roller 42 materials according to some embodiments and are given by way of example only.

TABLE 2

| Material | Steel | Aluminum | Ultra High Molecular Weight Polyethylene |
|---|---|---|---|
| Density (g/cm³) | 7.85 | 2.70 | 0.95 |
| Modulus of Elasticity (GPa) | 180-200 | 70-80 | 0.1-1.3 |

In Example 4, the inner elongate cylindrical portion 82 is made of steel and the sleeves 86a, 86b, 86c and 86d are made of Ultra High Molecular Weight Polyethylene (UHMW-PE). Steel has a greater density than UHMW-PE. Therefore, the inner elongate cylindrical portion 82 has a greater density than the sleeves 86a, 86b, 86c, 86d. Steel also has a greater modulus of elasticity than UHMW-PE. In some embodiments, the inner elongate cylindrical portion 82 has a modulus of elasticity that is at least 30 percent greater than the sleeves 86a, 86b, 86c, 86d. While UHMW-PE is included in Example 4, other polymers or polymer composites can be utilized.

In Example 5, the inner elongate cylindrical portion 82 is made of aluminum and the sleeves 86a, 86b, 86c and 86d are made of Ultra High Molecular Weight Polyethylene (UHMW-PE). Aluminum has a greater density than UHMW-PE. Therefore, the inner elongate cylindrical portion 82 has a greater density than the sleeves 86a, 86b, 86c, 86d. Aluminum also has a greater modulus of elasticity than UHMW-PE. In some embodiments, the inner elongate cylindrical portion 82 has a modulus of elasticity that is at least 30 percent greater than the sleeves 86a, 86b, 86c, 86d. While UHMW-PE is included in Example 5, other polymers or polymer composites can be utilized.

In Example 6, the inner elongate cylindrical portion 82 is made of steel and the sleeves 86a, 86b, 86c and 86d are made of aluminum. Steel has a greater density than aluminum. Therefore, the inner elongate cylindrical portion 82 has a greater density than the sleeves 86a, 86b, 86c and 86d. Steel also has a greater modulus of elasticity than aluminum. In some embodiments, the inner elongate cylindrical portion 82 has a modulus of elasticity that is at least 30 percent greater than the sleeves 86a, 86b, 86c and 86d.

Figure 12:
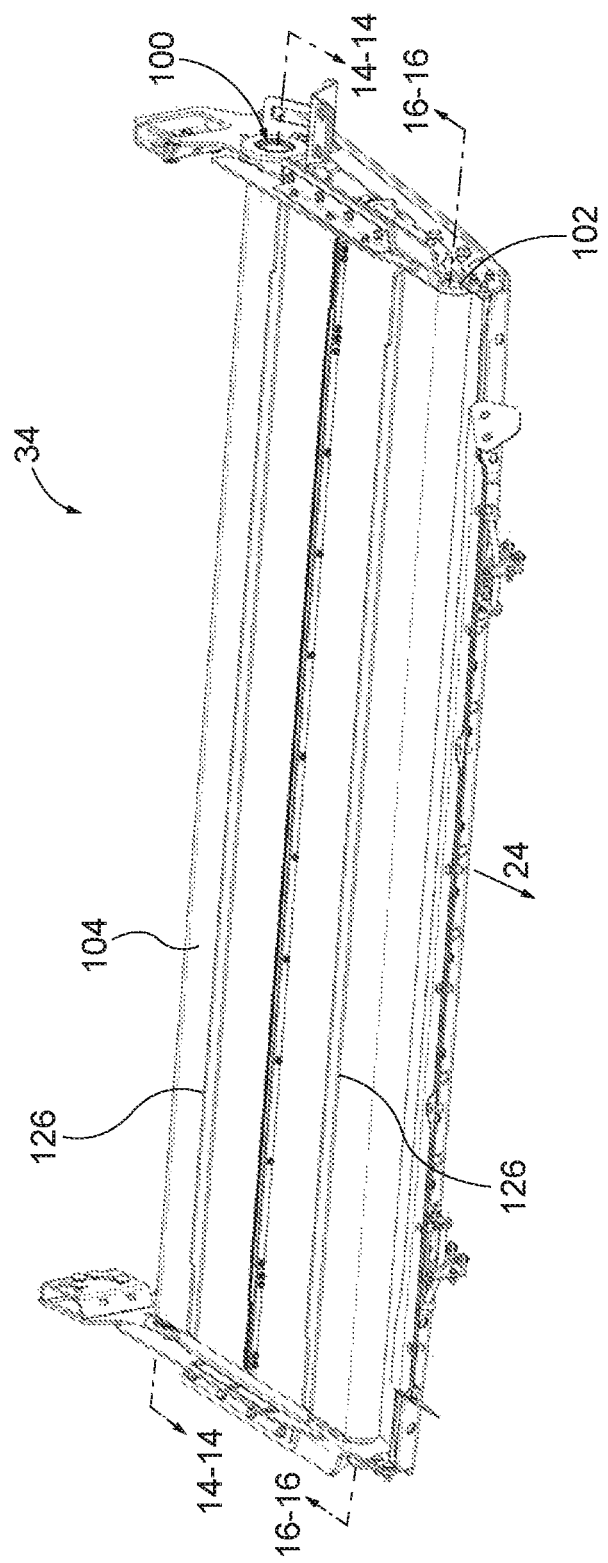
FIG. 12 is a perspective view of a third conveyor belt of the harvesting platform.
Figure 13:
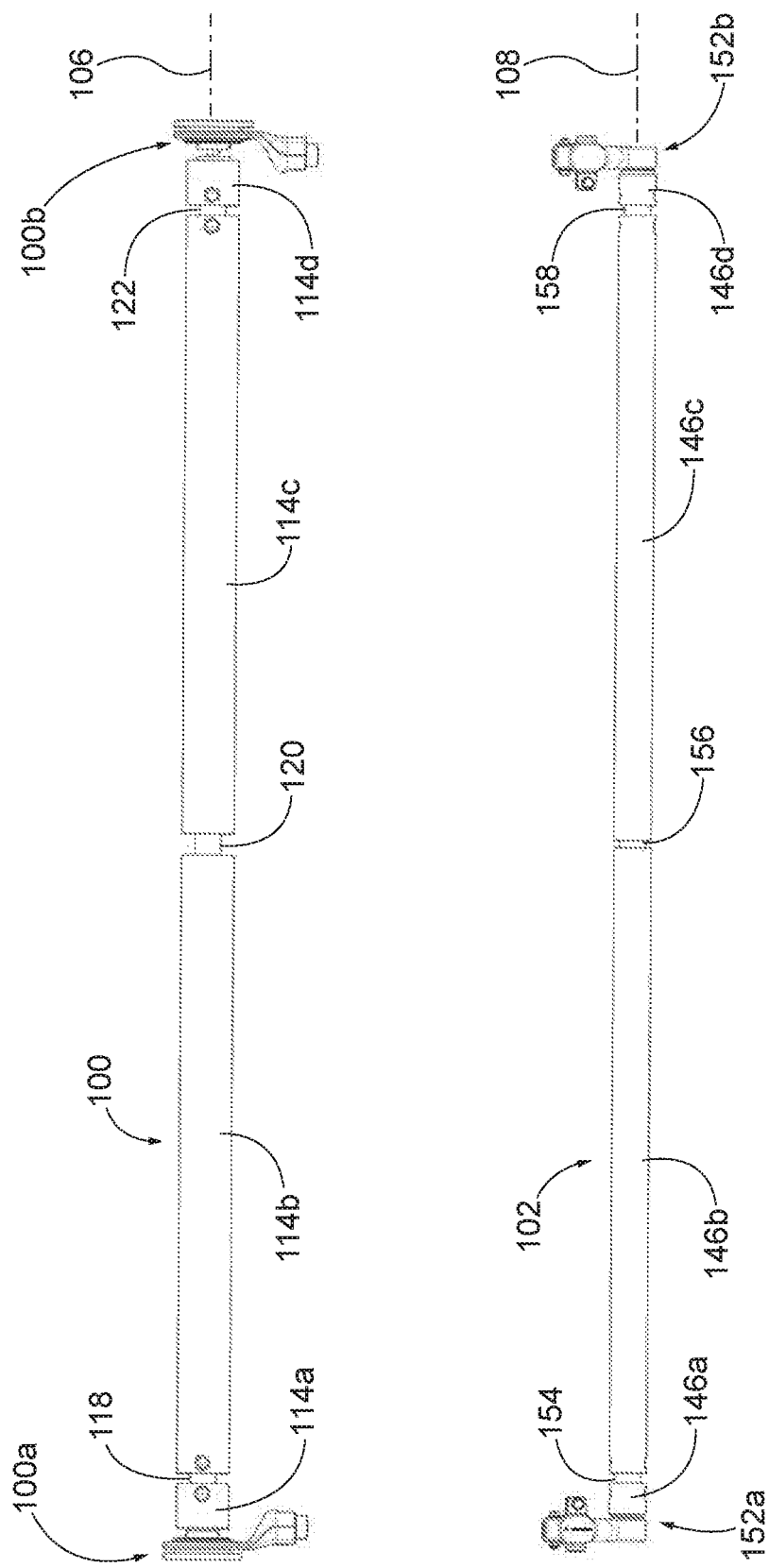
FIG. 13 is a top view of the rollers of FIG. 12.

FIG. 12 illustrates the third conveyor assembly 34 in greater detail. The third conveyor assembly 34 includes a third drive roller 100, a third idler roller 102, and a third draper belt 104. The third drive roller 100 extends perpendicular to the direction of travel 24 and is configured to rotate about a third drive axis 106 via the prime mover 16 or a separate power source. The third idler roller 102 extends perpendicular to the direction of travel 24 and is configured to rotate about a third idler axis 108. The third draper belt 104 extends around the third drive roller 100 and the third idler roller 102. The third draper belt 104 engages the third drive roller 100 to move around the third drive roller 100 and thereby rotate the third idler roller 102 in response to rotation of the third drive roller 100. In some embodiments, the positions of the third drive roller 100 and the third idler roller 102 are exchanged without changing the functioning of the third draper belt 104. FIG. 13 shows the third drive roller 100 and the third idler roller 102 with the remaining parts of the third conveyor assembly 34 removed for clarity.

Figure 14:
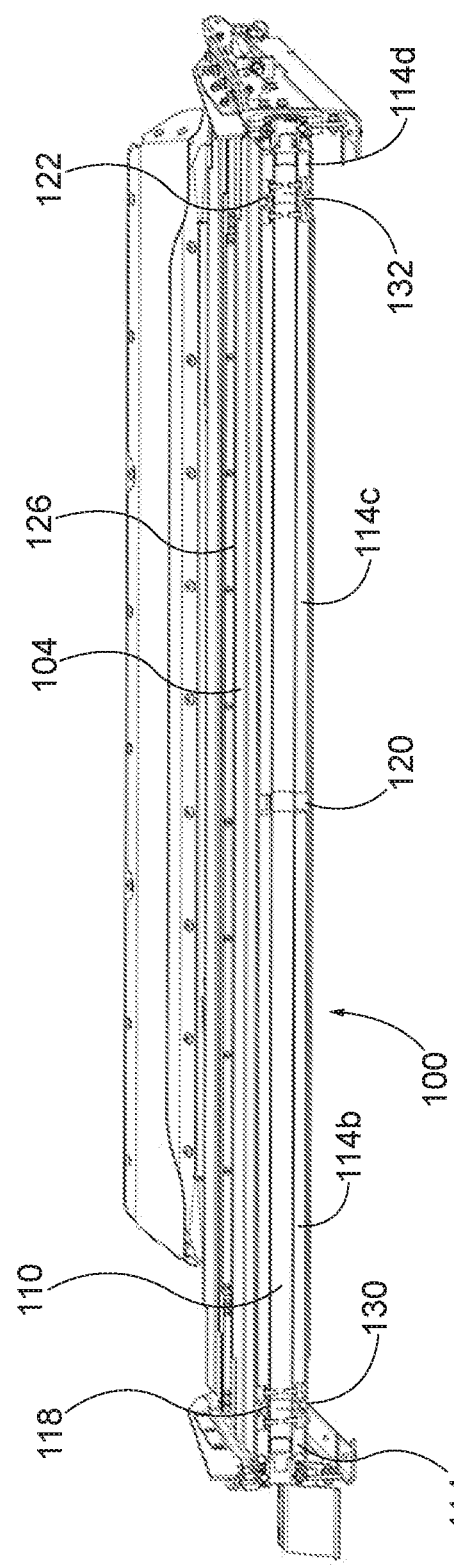
FIG. 14 is a cross-sectional view of the idler roller taken along line 14-14 of FIG. 12.
Figure 15:
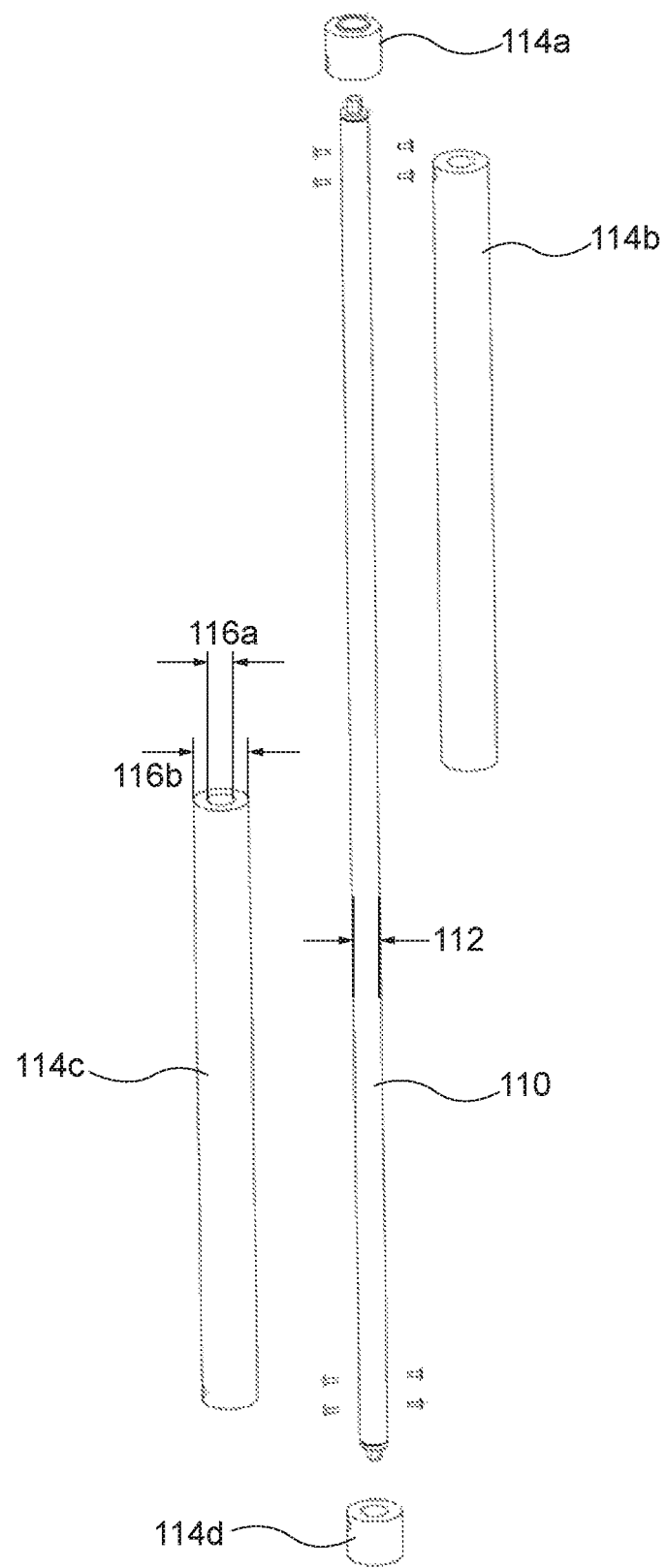
FIG. 15 is an exploded view of the idler roller of FIG. 14.

With reference to FIGS. 13-15, the third drive roller 100 includes an inner elongate substantially cylindrical portion 110 that extends along a third length and defines a third diameter 112 that is substantially constant along the third length. The third drive roller 100 also includes a first sleeve 114a, a second sleeve 114b, a third sleeve 114c and a fourth sleeve 114d. The sleeves 114a, 114b, 114c, 114d have an inner diameter 116a that substantially corresponds to the third diameter 112 and an outer diameter 116b that is greater than the inner diameter 116a. The sleeves 114a, 114b, 114c and 114d substantially surround the inner elongate cylindrical portion 110. The first sleeve 114a is positioned adjacent a first end 100a of the third drive roller 100 and the second sleeve 114b is positioned near the first sleeve 114a, but is spaced apart from the first sleeve 114a to form a seventh gap 118 between the first sleeve 114a and the second sleeve 114b. The third sleeve 114c is positioned near the second sleeve 114b, but is spaced apart from the second sleeve 114b to form an eighth gap 120 between the second sleeve 114b and the third sleeve 114c. The fourth sleeve 114d is positioned near the third sleeve 114c, but is spaced apart from the third sleeve 114c to form a ninth gap 122 between the third sleeve 114c and the fourth sleeve 114d. The fourth sleeve 114d is also positioned adjacent a second end 100b of the third drive roller 100. The inner elongate cylindrical portion 110 extends along substantially the entire distance between the first end 100a and the second end 100b. The third length of the third portion is greater than a sum of a length of the first, second, third and fourth sleeves 114a, 114b, 114c and 114d.

As shown in FIG. 12, the third draper belt 104 includes a plurality of ribs 126 extending outward from the third draper belt 104. The ribs 126 are configured to move harvested grain toward the combine in response to movement of the third draper belt 104 around the third drive roller 100 and the third idler roller 102. Other quantities and configurations of ribs 126 can be utilized in other embodiments.

As shown in FIG. 14, the third draper belt 104 includes an outer surface and an inner surface. The outer surface includes the ribs 126 and the inner surface includes a first protrusion 130 and a second protrusion 132. The first protrusion 130 extends substantially perpendicular to the ribs 126 and extends into the seventh gap 118 formed between the first sleeve 114*a* and the second sleeve 114*b*. The second protrusion 132 extends substantially perpendicular to the ribs 126 and extends into the ninth gap 122 formed between the third sleeve 114*c* and the fourth sleeve 114*d*.

The seventh and ninth gaps 118 and 122 engage the respective protrusions 130 and 132 to retain the third draper belt 104 in the correct position on the third drive roller 100. The outer diameter of the third drive roller 100 must be large enough to increase durability of the third draper belt 104 during use. Previously, the gaps were formed by machining grooves into an outer surface of the roller. This added manufacturing time and cost as well as creating stress risers under a tension load. In order to combat the stress risers, extra material was added to an outer surface of the third drive roller 100, which further added manufacturing time and cost. In the illustrated embodiment, the eighth gap 120 is provided to permit adjustment of the width of the seventh and ninth gaps 118 and 122. In some embodiments, an additional protrusion extends into the eighth gap 120. Additional configurations of gaps and protrusions are possible and can be utilized in other embodiments.

The inner elongate cylindrical portion 110 of the third drive roller 100 includes a first material and the sleeves 114*a*, 114*b*, 114*c* and 114*d* of the drive roller 100 include a second material that has different material properties than the first material. The sleeves 114*a*, 114*b*, 114*c* and 114*d* can be pressed, molded around or otherwise secured to the inner elongate substantially cylindrical portion 110. The sleeves 114*a*, 114*b*, 114*c* and 114*d* are secured to the inner elongate substantially cylindrical portion 110 by bolts, rivets, epoxy or other suitable mechanical fastener, or by a press fit relationship. Little if any stress risers exist on the inner elongate cylindrical portion 110 of the drive roller 100 or any of the sleeves 114*a*, 114*b*, 114*c* and 114*d*.

The inner elongate cylindrical portion 110 bears essentially the entire load of the third draper belt 104 while the sleeves 114*a*, 114*b*, 114*c*, 114*d* increase the diameter of the drive roller 100 to the acceptable minimum diameter to increase durability of the third draper belt 104. The sleeves 114*a*, 114*b*, 114*c*, 114*d* are designed in a variety of configurations to create an outer profile that corresponds to the inner surface of the third draper belt 104.

In some embodiments, the first material is metallic and the second material is a composite. Possible composites include polyethylene, ultra-high-molecular-weight polyethylene and other polymers and polymer composites. In other embodiments, the first material is a relatively heavy metal and the second material is a relative light metal. The second material is lighter in weight than the first material, thus reducing the overall weight of the third drive roller 100. The second material can be selected to reduce friction between the third draper belt 104 and the third drive roller 100 to thereby increase a lifespan of the third drive roller 100, the third draper belt 104 or both.

Table 3 below includes a few possible options of drive roller 100 materials according to some embodiments and are given by way of example only.

TABLE 3

| Material | Steel | Aluminum | Ultra High Molecular Weight Polyethylene |
|---|---|---|---|
| Density (g/cm³) | 7.85 | 2.70 | 0.95 |
| Modulus of Elasticity (GPa) | 180-200 | 70-80 | 0.1-13 |

In Example 7, the inner elongate cylindrical portion 110 is made of steel and the sleeves 114*a*, 114*b*, 114*c* and 114*d* are made of Ultra High Molecular Weight Polyethylene (UHMW-PE). Steel has a density that is greater than the density of UHMW-PE. Therefore, the inner elongate cylindrical portion 110 has a greater density than the sleeves 114*a*, 114*b*, 114*c* and 114*d*. Steel also has a greater modulus of elasticity than UHMW-PE. In some embodiments, the inner elongate cylindrical portion 110 has a modulus of elasticity that is at least 30 percent greater than the modulus of elasticity of the sleeves 114*a*, 114*b*, 114*c* and 114*d*. While UHMW-PE is included in Example 7, other polymers or polymer composites can be utilized.

In Example 8, the inner elongate cylindrical portion 110 is made of aluminum and the sleeves 114*a*, 114*b*, 114*c* and 114*d* are made of Ultra High Molecular Weight Polyethylene (UHMW-PE). Aluminum has a greater density than UHMW-PE. Therefore, the inner elongate cylindrical portion 110 has a greater density than the sleeves 114*a*, 114*b*, 114*c* and 114*d*. Aluminum also has a greater modulus of elasticity than UHMW-PE. In some embodiments, the inner elongate cylindrical portion 110 has a modulus of elasticity that is at least 30 percent greater than the modulus of elasticity of the sleeves 114*a*, 114*b*, 114*c* and 114*d*. While UHMW-PE is included in Example 8, other polymers or polymer composites can be utilized.

In Example 9, the inner elongate cylindrical portion 110 is made of steel and the sleeves 114*a*, 114*b*, 114*c* and 114*d* are made of aluminum. Steel has a greater density than aluminum. Therefore, the inner elongate cylindrical portion 110 has a greater density than the sleeves 114*a*, 114*b*, 114*c* and 114*d*. Steel also has a greater modulus of elasticity than aluminum. In some embodiments, the inner elongate cylindrical portion 110 has a modulus of elasticity that is at least 30 percent greater than the sleeves 114*a*, 114*b*, 114*c* and 114*d*.

Figure 16:
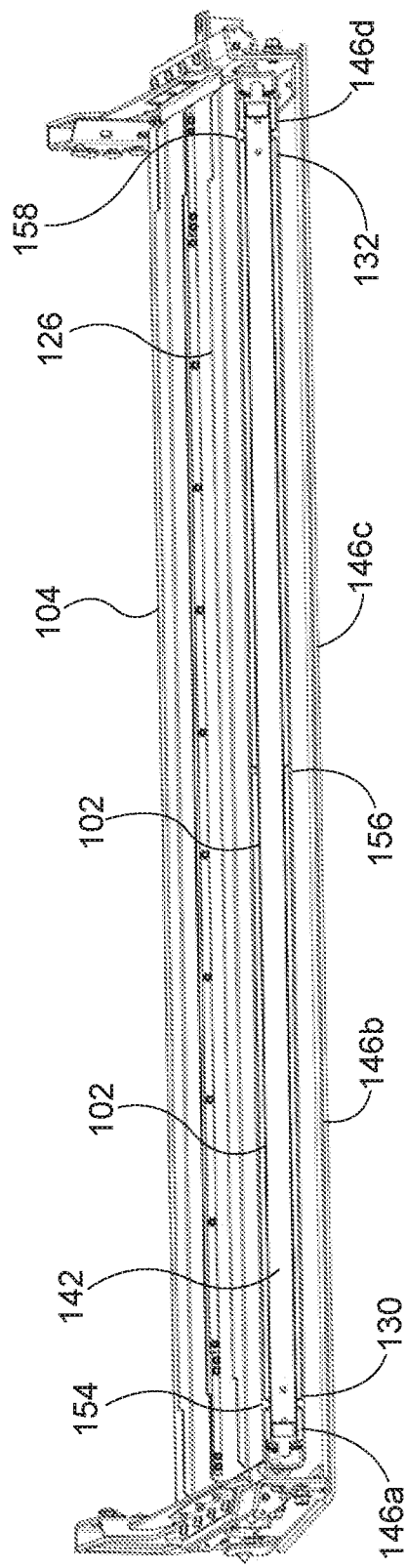
FIG. 16 is a cross-sectional view of the drive roller taken along line 16-16 of FIG. 12.
Figure 17:
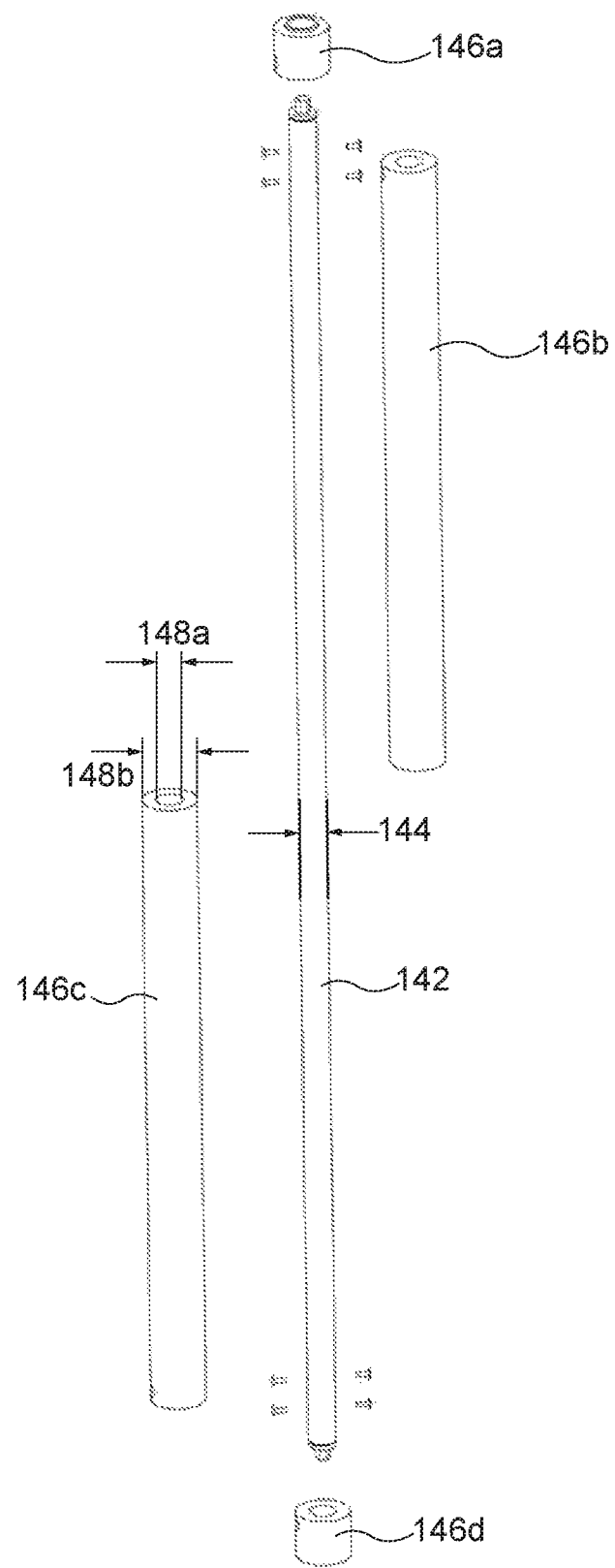
FIG. 17 is an exploded view of the drive roller of FIG. 16.

FIGS. 13, 16 and 17 illustrate the third idler roller 102 in greater detail. In some embodiments, the third idler roller 102 is substantially identical to the third drive roller 100. The main difference is that the third drive roller 100 is connected to a power source to rotate the third drive roller 100, whereas the third idler roller 102 is rotated in response to rotation of the third draper belt 104 in response to rotation of the third drive roller 100. The third idler roller 102 includes an inner elongate substantially cylindrical portion 142 that extends along a third length and defines a third diameter 144 that is substantially constant along the third length.

The third idler roller 102 also includes a first sleeve 146*a*, a second sleeve 146*b*, a third sleeve 146*c* and a fourth sleeve 146*d*. The sleeves 146*a*, 146*b*, 146*c* and 146*d* have an inner diameter 148*a* that substantially corresponds to the third diameter 144 and an outer diameter 148*b* that is greater than the inner diameter 148*a*. The sleeves 146*a*, 146*b*, 146*c* and 146*d* substantially surround the inner elongate cylindrical portion 142. The first sleeve 146*a* is positioned adjacent a first end 152*a* of the third idler roller 102 and the second sleeve 146*b* is positioned near the first sleeve 146*a*, but is spaced apart from the first sleeve 146*a* to form a tenth gap 154 between the first sleeve 146*a* and the second sleeve 146*b*. The third sleeve 146*c* is positioned near the second sleeve 146*b*, but is spaced apart from the second sleeve 146*b* to form an eleventh gap 156 between the second sleeve 146*b* and the third sleeve 146*c*. The fourth sleeve 146*d* is positioned near the third sleeve 146*c*, but is spaced apart from the third sleeve 146*c* to form a twelfth gap 158 between the third sleeve 146*c* and the fourth sleeve 146*d*. The fourth sleeve 146*d* is also positioned adjacent a second end 152*b* of the third idler roller 102. The inner elongate cylindrical portion 142 extends along substantially the entire distance between the first end 152*a* and the second end 152*b*. The third length of the inner elongate cylindrical portion 142 is greater than a sum of a length of the first, second, third and fourth sleeves 146*a*, 146*b*, 146*c* and 146*d*.

As shown in FIG. 16, the first protrusion 130 of the third draper belt 104 extends into the tenth gap 154 formed between the first sleeve 146*a* and the second sleeve 146*b*. The second protrusion 132 extends into the twelfth gap 158 formed between the third sleeve 146*c* and the fourth sleeve 146*d*. In the illustrated embodiment, the eleventh gap 156 is provided to permit adjustment of the width of the tenth and twelfth gaps 154 and 158. In some embodiments, an additional protrusion extends into the eleventh gap 156.

The tenth and twelfth gaps 154 and 158 engage the respective protrusions 130 and 132 to retain the third draper belt 104 in the correct position on the third idler roller 102. The outer diameter of the third idler roller 102 must be large enough to increase durability of the third draper belt 104 during use. Previously, the gaps were formed by machining grooves into an outer surface of the roller. This added manufacturing time and cost as well as creating stress risers under a tension load. In order to combat the stress risers, extra material was added to an outer surface of the third idler roller 102, which further added manufacturing time and cost. In the illustrated embodiment, the eleventh gap 156 is provided to permit adjustment of the width of the tenth and twelfth gaps 154 and 158. In some embodiments, an additional protrusion extends into the eleventh gap 156. Additional configurations of gaps and protrusions are possible and can be utilized in other embodiments.

The inner elongate cylindrical portion 142 of the third idler roller 102 includes a first material and the sleeves 146*a*, 146*b*, 146*c* and 146*d* of the third idler roller 102 include a second material that has different material properties than the first material. The inner elongate cylindrical portion 142 bears essentially the entire load of the third draper belt 104 while the sleeves 146*a*, 146*b*, 146*c* and 146*d* increase the diameter of the idler roller 102 to the acceptable minimum diameter to increase durability of the third draper belt 104. The sleeves 146*a*, 146*b*, 146*c* and 146*d* are designed in a variety of configurations to create an outer profile that corresponds to the inner surface of the third draper belt 104.

In some embodiments, the first material is metallic and the second material is a composite. Possible composites include polyethylene, ultra-high-molecular-weight polyethylene and other polymers and polymer composites. In other embodiments, the first material is a relatively heavy metal and the second material is a relative light metal. The second material is lighter in weight than the first material, thus reducing the overall weight of the third idler roller 102. The second material can be selected to reduce friction between the third draper belt 104 and the third idler roller 102 to thereby increase a lifespan of the third idler roller 102, the third draper belt 104 or both.

The sleeves 146*a*, 146*b*, 146*c* and 146*d* can be pressed, molded around or otherwise secured to the inner elongate substantially cylindrical portion 142. The sleeves 146*a*, 146*b*, 146*c* and 146*d* are secured to the inner elongate substantially cylindrical portion 142 by bolts, rivets, epoxy or other suitable mechanical fastener, or by a press fit relationship. Little if any stress risers exist on the inner elongate cylindrical portion 142 of the idler roller 102 or any of the sleeves 146*a*, 146*b*, 146*c* and 146*d*.

Table 4 below includes a few possible options of idler roller 42 materials according to some embodiments and are given by way of example only.

TABLE 4

| Material | Steel | Aluminum | Ultra High Molecular Weight Polyethylene |
|---|---|---|---|
| Density (g/cm$^3$) | 7.85 | 2.70 | 0.95 |
| Modulus of Elasticity (GPa) | 180-200 | 70-80 | 0.1-1.3 |

In Example 10, the inner elongate cylindrical portion 142 is made of steel and the sleeves 146*a*, 146*b*, 146*c* and 146*d* are made of Ultra High Molecular Weight Polyethylene (UHMW-PE). Steel has a greater density than UHMW-PE. Therefore, the inner elongate cylindrical portion 142 has a greater density than the sleeves 146*a*, 146*b*, 146*c* and 146*d*. Steel also has a greater modulus of elasticity than UHMW-PE. In some embodiments, the inner elongate cylindrical portion 142 has a modulus of elasticity that is at least 30 percent greater than the sleeves 146*a*, 146*b*, 146*c* and 146*d*. While UHMW-PE is included in Example 10, other polymers or polymer composites can be utilized.

In Example 11, the inner elongate cylindrical portion 142 is made of aluminum and the sleeves 146*a*, 146*b*, 146*c* and 146*d* are made of Ultra High Molecular Weight Polyethylene (UHMW-PE). Aluminum has a greater density than UHMW-PE. Therefore, the inner elongate cylindrical portion 142 has a greater density than the sleeves 146*a*, 146*b*, 146*c* and 146*d*. Aluminum also has a greater modulus of elasticity than UHMW-PE. In some embodiments, the inner elongate cylindrical portion 142 has a modulus of elasticity that is at least 30 percent greater than the sleeves 146*a*, 146*b*, 146*c* and 146*d*. While UHMW-PE is included in Example 11, other polymers or polymer composites can be utilized.

In Example 12, the inner elongate cylindrical portion 142 is made of steel and the sleeves 146*a*, 146*b*, 146*c* and 146*d* are made of aluminum. Steel has a greater density than aluminum. Therefore, the inner elongate cylindrical portion 142 has a greater density than the sleeves 146*a*, 146*b*, 146*c* and 146*d*. Steel also has a greater modulus of elasticity than aluminum. In some embodiments, the inner elongate cylindrical portion 142 has a modulus of elasticity that is at least 30 percent greater than the sleeves 146*a*, 146*b*, 146*c* and 146*d*.

In each of the examples given above, the present disclosure provides a roller that is made of two different materials having different material properties. This allows a reduction in the overall weight of the rollers without sacrificing strength and durability. Also, each of the rollers in the examples includes gaps or grooves that are formed into the rollers without requiring machining. The gaps or grooves mate with the draper belt to maintain the draper belt in the correct position as the draper belt moves over the rollers.

What is claimed is:

1. A harvester comprising:
    a combine including a prime mover operable to move the combine over a ground surface in a direction of travel; and
    a harvesting platform coupled to the combine for movement with the combine over the ground surface, the harvesting platform including
        a drive roller configured to rotate about a first axis,
        an idler roller configured to rotate about a second axis, the idler roller including a first portion and a second portion, the first portion of the idler roller defining a first diameter and including a first material, the second portion of the idler roller defining a second diameter and including a second material, the second diameter being greater than the first diameter and the second portion substantially surrounding the first portion, the second material having different material properties than the first material, and a conveyor coupled to the drive roller and to the idler roller, the conveyor configured to move in response to rotation of the drive roller.

2. The harvester of claim 1, wherein the first material has a first density and the second material has a second density, wherein the first density is greater than the second density.

3. The harvester of claim 1, wherein the first material has a first modulus of elasticity and the second material has a second modulus of elasticity, wherein the first modulus of elasticity is at least 30 percent greater than the second modulus of elasticity.

4. The harvester of claim 1, wherein the first material is metallic and the second material includes a polymer.

5. The harvester of claim 1, wherein the first material is metallic and the second material is metallic.

6. The harvester of claim 1, wherein the first portion extends along a first length, wherein the first diameter is substantially constant along the first length, wherein the second portion defines a second inner diameter and a second outer diameter, the second inner diameter is substantially equal to the first diameter and the second outer diameter is greater than first diameter, and wherein the second material has a smaller coefficient of friction than the first material.

7. The harvester of claim 6, wherein the second portion includes a first segment and a second segment, the first segment extending along a first segment length and the second segment extending along a second segment length, wherein the first length is greater than the sum of the first segment length and the second segment length, and wherein the conveyor extends across the first segment and the second segment.

8. The harvester of claim 7, wherein the second portion further comprises a third segment, the third segment extending along a third segment length, wherein the first length is greater than the sum of the first segment length, the second segment length and the third segment length.

9. The harvester of claim 8, wherein the first portion defines a first end and a second end, wherein the first segment is positioned near the first end of the first portion and wherein the second segment is positioned near the second end of the first portion, wherein the third segment is positioned between the first segment and the second segment such that a first gap is formed between the first segment and the third segment and that a second gap is formed between the second segment and the third segment, wherein the conveyor defines a first protrusion and a second protrusion, wherein the first protrusion extends into the first gap and the second protrusion extends into the second gap.

10. A harvesting platform configured to be coupled to a combine for movement with the combine over a ground surface in a direction of travel, the harvesting platform comprising:

a cutter bar configured to cut grain being harvested;

a reel configured to press the grain against the cutter bar to thereby cut the grain;

a drive roller configured to rotate about a first axis, the drive roller including a first portion and a second portion, the first portion of the drive roller defining a first diameter and including a first material, the second portion of the drive roller defining a second diameter and including a second material, the second diameter being greater than the first diameter and the second portion substantially surrounding the first portion, the second material having different material properties than the first material;

an idler roller configured to rotate about a second axis; and a conveyor coupled to the drive roller and to the idler roller, the conveyor configured to move in response to rotation of the drive roller, to thereby move harvested grain toward the combine.

11. The harvesting platform of claim 10, wherein the first material has a first density and the second material has a second density, wherein the first density is greater than the second density.

12. The harvesting platform of claim 10, wherein the first material has a first modulus of elasticity and the second material has a second modulus of elasticity, wherein the first modulus of elasticity is at least 30 percent greater than the second modulus of elasticity.

13. The harvesting platform of claim 10, wherein the first material is metallic and the second material includes a polymer.

14. The harvesting platform of claim 10, wherein the first material is metallic and the second material is metallic.

15. The harvesting platform of claim 10, wherein the first portion extending along a first length, wherein the first diameter is substantially constant along the first length, and wherein the second portion defines a second inner diameter and a second outer diameter, the second inner diameter is substantially equal to the first diameter and the second outer diameter is greater than first diameter, and wherein the second material has a smaller coefficient of friction than the first material.

16. The harvesting platform of claim 15, wherein the second portion includes a first segment and a second segment, the first segment extending along a first segment length and the second segment extending along a second segment length, wherein the first length is greater than the sum of the first segment length and the second segment length, and wherein the conveyor extends across the first segment and the second segment.

17. The harvesting platform of claim 16, wherein the second portion further comprises a third segment, the third segment extending along a third segment length, wherein the first length is greater than the sum of the first segment length, the second segment length and the third segment length.

18. The harvesting platform of claim 17, wherein the first portion defines a first end and a second end, wherein the first segment is positioned near the first end of the first portion and wherein the second segment is positioned near the second end of the first portion, wherein the third segment is positioned between the first segment and the second segment such that a first gap is formed between the first segment and the third segment and that a second gap is formed between the second segment and the third segment, the first gap and the second gap each receiving a respective protrusion of the conveyor.

19. A harvesting platform configured to be coupled to a combine for movement with the combine over a ground surface in a direction of travel, the harvesting platform comprising:

a cutter bar configured to cut grain being harvested;

a reel configured to press the grain against the cutter bar to thereby cut the grain;

a drive roller configured to rotate about a first axis, the drive roller including a first portion and a second portion, the first portion of the drive roller defining a first diameter and including a first material, the second portion of the drive roller defining a second diameter and including a second material, the second diameter being greater than the first diameter and the second portion substantially surrounding the first portion, the second material having different material properties than the first material;

an idler roller configured to rotate about a second axis, the idler roller including a first portion and a second portion, the first portion of the idler roller defining a first diameter and including the first material, the second portion of the idler roller defining a second diameter and including the second material, the second diameter being greater than the first diameter and the second portion substantially surrounding the first portion; and a conveyor coupled to the drive roller and to the idler roller, the conveyor configured to move in response to rotation of the drive roller, to thereby move harvested grain toward the combine.

20. The idler roller of claim 19, wherein the first material has a first density and the second material has a second density, wherein the first density is greater than the second density, wherein the first material has a first modulus of elasticity and the second material has a second modulus of elasticity, wherein the first modulus of elasticity is at least 30 percent greater than the second modulus of elasticity, and wherein the second material has a smaller coefficient of friction than the first material.

\* \* \* \* \*